US 11,884,783 B2

(12) United States Patent
Seidametov et al.

(10) Patent No.: US 11,884,783 B2
(45) Date of Patent: Jan. 30, 2024

(54) METHOD AND DEVICE FOR THE DESTRUCTIVE DISTILLATION OF POLYETHYLENE AND POLYPROPYLENE WASTE

(71) Applicants: Remzi Iskanderovich Seidametov, Simferopol (RU); Sabri Narimanovich Setmanbetov, village Yarkoe (RU)

(72) Inventors: Remzi Iskanderovich Seidametov, Simferopol (RU); Sabri Narimanovich Setmanbetov, village Yarkoe (RU)

( * ) Notice: Subject to any disclaimer, the term of this patent is extended or adjusted under 35 U.S.C. 154(b) by 439 days.

(21) Appl. No.: 17/294,269

(22) PCT Filed: Jul. 3, 2019

(86) PCT No.: PCT/RU2019/000475
§ 371 (c)(1),
(2) Date: May 14, 2021

(87) PCT Pub. No.: WO2020/096482
PCT Pub. Date: May 14, 2020

(65) Prior Publication Data
US 2022/0002515 A1    Jan. 6, 2022

(30) Foreign Application Priority Data

Jan. 22, 2019 (RU) .......................... RU2019101720

(51) Int. Cl.
*C08J 11/06* (2006.01)
*C10B 53/07* (2006.01)
*C08J 11/04* (2006.01)
(52) U.S. Cl.
CPC ............... *C08J 11/06* (2013.01); *C10B 53/07* (2013.01)
(58) Field of Classification Search
None
See application file for complete search history.

(56) References Cited

U.S. PATENT DOCUMENTS

2018/0155639 A1*   6/2018   Al-Ghamdi ............ C10G 69/08

FOREIGN PATENT DOCUMENTS

EP        3312223 A1    4/2018
RU        167118 U1    12/2016
(Continued)

OTHER PUBLICATIONS

International Search Report and Written Opinion dated Jan. 16, 2020 in connection with corresponding PCT Application No. PCT/RU2019/000475.

(Continued)

*Primary Examiner* — Tam M Nguyen
(74) *Attorney, Agent, or Firm* — Aird & McBurney LP

(57) ABSTRACT

The invention relates to a method and device for processing industrial and domestic polyethylene and polypropylene waste by destructive distillation. A method for the destructive distillation of polyethylene and polypropylene waste includes charging a destructive distillation reactor with polyethylene and polypropylene waste that has been pre-cleaned of contaminants by flotation, and heating the furnace of the distillation reactor using a fuel burner; maintaining the temperature in a hydrocarbon collector tank using exhaust gases, regulating the outlet temperature of a vapour-gas mixture of hydrocarbons, and recovering paraffin fractions; fractionating the remaining distillation products in a fractionating column, and regulating the outlet temperature of the remaining vapour-gas mixture from the fractionating column; cooling the remaining vapour-gas mixture, separating same into a naphtha fraction and a gas fraction, and charging a subsequent destructive distillation reactor with feedstock, wherein prior to charging, the bottom part of each reactor is coated with a layer of a non-stick lubricant, the reactor furnaces are connected with the aid of air cushions, and the reactors are charged in several steps (Continued)

Figure 1:
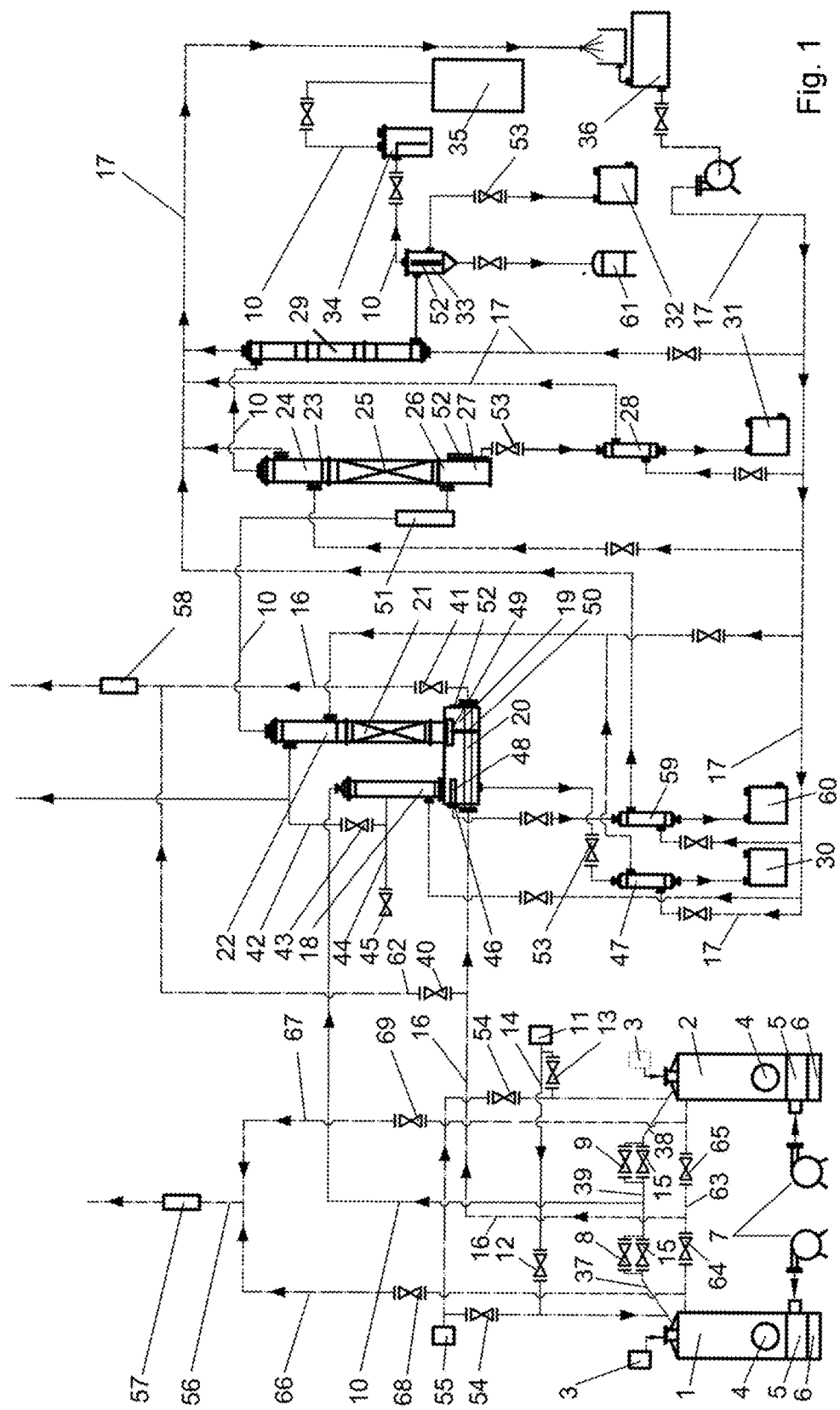

according to the following cycle: "charging a reactor with feedstock, generating a vacuum in the charged reactor space, heating the reactor to 110-260° C. to liquefy the charged feedstock".

11 Claims, 2 Drawing Sheets

(56) References Cited

FOREIGN PATENT DOCUMENTS

| | | |
|---|---|---|
| RU | 2621097 C2 | 5/2017 |
| WO | 2016209194 A1 | 12/2016 |

OTHER PUBLICATIONS

English translation of WO2016209194, Jan. 16, 2020.
English abstract for RU167118, Dec. 20, 2016.
English translation of RU2621097, Dec. 29, 2021.
English language translation of the International Search Report and Written Opinion, dated Jan. 16, 2020.

\* cited by examiner

METHOD AND DEVICE FOR THE DESTRUCTIVE DISTILLATION OF POLYETHYLENE AND POLYPROPYLENE WASTE

The inventions relate to treatment methods for industrial and domestic waste from synthetic polymer materials, mainly from polyethylene and polypropylene, by destructive distillation with subsequent disposal of degradation products, and to devices for thermal and thermo-catalytic degradation of synthetic polymer materials waste.

The method for destructive distillation of polyethylene and polypropylene waste, described in RF patent No. 2621097 for invention *Device for Thermal Degradation of Polyethylene and Polypropylene Waste*, C08J11/04; B29B17/; C10B53/00; C10B53/07; C10G1/00, 2017 is known as closest prior art. The continuous operation method is performed as follows. Pre-crushed (or granular) polymer, cleaned by flotation from polyvinylchloride, polyethylene terephthalate, cellulose, rags, rubber and other impurities, is continuously fed by a screw feeder into thermal degradation (destructive distillation) reactor equipped with a furnace and a fuel burner burning both liquid and gaseous own-produced fuels. The fuel burner is turned on and the unit is brought to operating temperature range. To bring the unit to a given range faster, the fuel (exhaust) gases generated by fuel combustion go to re-boiler of the dewaxing unit bottom (hydrocarbon receiver) and distillation column bottom. Operating temperatures should be kept at: 450-480° C. for thermal degradation reactor (controlled by changing the fuel supply); 300-360° C. for hydrocarbon receiver; 180-300° C. for outlet vapor-gas mixture temperature from the dewaxing unit (controlled by water supply to the reflux column of the dewaxing unit); 160-220° C. for distillation column bottom (controlled by changing the temperature of the vapor-gas mixture after the dewaxing unit and in the distillation column overhead); 35-100° C. for outlet vapor-gas mixture temperature from the distillation column (controlled by water supply to the reflux column). When operating temperatures are reached in the hydrocarbon receiver and in the distillation column bottom, fuel gases are cut off by closing the dampers before the inlet and after the outlet, dumping exhaust gases at 470-500° C. in the air. Carbon residue (coke) is continuously drawn by a screw. Heating oil is continuously drained from the distillation column bottom. The content of the thermal degradation reactor is heated at 1,5-4° C./minute by fuel gases with a temperature of 600-900° C. that pass through the thermal degradation reactor's flame tubes to the re-boiler of dewaxing unit's hydrocarbon receiver, and then to the re-boiler of the distillation column. At 260-300° C. in the thermal degradation reactor, plastics start degrading. Plastic degradation products in the form of vapor-gas mixture of hydrocarbons from the thermal degradation reactor go into the catalyst column, a flanged tubular unit loaded with catalyst—titanium spirals in the cassette, and then to the heat exchanger above the hydrocarbon receiver of the vapor-gas mixture dewaxing unit. When vapor temperature reaches 360° C., circulating water is supplied to the heat exchanger above the hydrocarbon receiver of the vapor-gas mixture dewaxing unit to cool the vapor-gas mixture of hydrocarbons. The temperature in the hydrocarbon receiver should be maintained at 300-360° C. by varying the water flow rate in the heat exchanger. The vapor-gas mixture of hydrocarbons flows to the hydrocarbon receiver of the dewaxing unit, where high-boiling hydrocarbons are converted to a liquid phase. Then the vapor-gas mixture flows to the dewaxing unit, a column, the bottom of which is loaded with a mass-exchanging packed bed—titanium chips catalysts, and the overhead of which has a shell-and-tube heat exchanger serving as a reflux column. Circulating water is fed to the outside of the dewaxing unit's heat exchanger tubes, while hydrocarbons (paraffins) are condensed in the dewaxing unit's heat exchanger tubes. Condensed waxes go back to the hydrocarbon receiver. The outlet vapor temperature from the dewaxing unit should be maintained at 180-300° C. by varying the water supply to the dewaxing unit's shell-and-tube heat exchanger serving as a reflux column. Hydrocarbon vapors then flow to the distillation column, where they are separated into gasoline and diesel fractions. The diesel fraction in the distillation column bottom flows through the heat exchanger of the distillation column, cooled with circulating water, to the diesel fuel receiver. Gasoline fraction in gaseous form and hydrocarbon gas in the distillation column overhead flow to gas cooling and water and gasoline vapor condensation heat exchanger. Gasoline fraction in the form of vapor and hydrocarbon gas (gas fraction) in the distillation column overhead flow to gas fraction cooling and gasoline vapor and water condensation heat exchanger. Diesel quality (flash point, fractional composition) is controlled by the temperature of the distillation column bottom, which is 160-220° C. Gasoline fraction quality (density, fractional composition and end point) is controlled by the temperature at the outlet of the distillation column. The overhead temperature of the distillation column is maintained at 35-100° C. by supplying water to the reflux column of the distillation column. Reflux column is a shell-and-tube heat exchanger, circulating water is supplied to the outside of tubes of which, and in the tubes of which high-boiling hydrocarbons are condensed. Gasoline fraction vapors are condensed in the gas cooling and gasoline vapor and water condensation heat exchanger, which is cooled by circulating water. The gas/water separator separates water and hydrocarbon gas (gas fraction) from gasoline. Uncondensed hydrocarbon gas flows to the thermal degradation reactor burner, and excess hydrocarbon gas is collected in a gas holder. Water and gasoline go to relevant receivers. Heavy fraction—heating oil (mainly waxes) is accumulated in dewaxing unit bottom and removed at the end of the thermal degradation, when no hydrocarbon gas is generated, through the heating oil heat exchanger, which is cooled by the cooling system, to the heating oil receiver (also known as the wax-wax fraction receiver). Plastics degradation process ends at 450-480° C. Fuel to the burner should be cut off. Once the thermal degradation reactor is cooled, carbon residue remaining at its bottom is discharged through the lower hatch of the thermal degradation reactor to the coke receiver. The furnace with heavy lining is detached from the reactor by lowering it on wheels and taking aside for separate cooling of the furnace and the reactor (which is cooled by air supplied from the gas blower of the fuel burner).

Intermittent operation involves two reactors. While the first thermal degradation reactor is in operation, the other idle thermal degradation reactor is loaded with plastic waste and prepared for start-up. The still hot furnace with heavy lining is attached to this cold, not yet heated reactor. As soon as the fuel to the burner of the operating first thermal degradation reactor is cut off, the burner of the previously idle thermal degradation reactor is immediately turned on, thus initiating degradation process. That said, temperature conditions should be maintained as in the previous cycle. Having run the thermal degradation process in this thermal degradation reactor, it should be put in cooling mode, and the other thermal degradation reactor should be fed with plastic waste for a new cycle: "thermal degradation-cooling-carbon residue discharge-plastic waste feed".

The features of the closest prior art that are the same as the essential features of the first invention are that polyethylene and polypropylene waste destructive distillation method involves: feeding polyethylene and polypropylene waste to the first destructive distillation reactor that is pre-cleaned by flotation from polyvinylchloride, polyethylene terephthalate, cellulose, organic compounds, rubber impurities; attaching and heating the furnace of the first destructive distillation reactor by a fuel burner; heating and maintaining the temperature in the hydrocarbon receiver with exhaust gases, controlling the outlet temperature of vapor-gas mixture of hydrocarbons from the dewaxing unit by supplying cooling water to the dewaxing unit's reflux column, collecting wax fractions; fractionating the remaining products of destructive distillation in the distillation column to obtain the vapor phase of the gasoline fraction and the liquid phase of the diesel fraction, controlling the outlet temperature of remaining vapor-gas mixture from the distillation column by supplying cooling water to the distillation column's reflux column; cooling the remaining vapor-gas mixture in the column of a constantly operating heat exchanger, separating it into gasoline and gas fractions; feeding the other destructive distillation reactor; cutting off fuel to the burner of the first reactor; lowering and cooling the furnace of the first reactor, attaching the furnace of the other reactor and heating it with a burner; discharging carbon residue from cooled destructive distillation reactors.

The device for destructive distillation of polyethylene and polypropylene waste, described in RF patent No. 2621097 for invention Device for Thermal Degradation of Polyethylene and Polypropylene Waste, C08J11/04; B29B17/; C10B53/00; C10B53/07; C10G1/00, 2017 is known as closest prior art. The description presents two options of the device. The device taken as closest prior art, used in the said closest prior art in intermittent operation, is equipped with at least two parallel heating units, each of which contains a thermal degradation (destructive distillation) reactor with top feed (through the feeding unit) and bottom coke discharge through the hatch. In turn, each of the destructive distillation reactors, or one of them, has a removable mobile furnace with heavy lining designed to be detached from the reactor where the thermal degradation (destructive distillation) process completed, and attached to the reactor where destructive distillation starts by lowering it on wheels and taking aside for separate cooling; fuel burner burning both liquid and gaseous own-produced fuel; coke receiver for carbon residue remaining at the reactor bottom after cooling that is removed through the lower (side) reactor hatch. The second option used in the so-called continuous operation with one heating unit, also has a similar reactor, but with side screw feed and side screw discharge through the side hatch, a furnace with heavy lining, burner, coke (carbon residue) collector. Carbon residue (coke) remaining at the bottom of the reactor after cooling under continuous operation is discharged into the coke receiver with a screw. The heating unit is connected through the vapor-gas mixture piping and catalyst column) to the decomposition unit for polymer feedstock destructive distillation products, the design of which is common for the first and second option of the similar invention, and which consists of the following items connected in sequence: water cooled heat exchanger with "introduced reverse flow" with a downflow of a vapor-gas mixture of hydrocarbons, with tubes; hydrocarbon receiver with a re-boiler executed as a horizontal cylindrical container; dewaxing unit, consisting of a packed bottom part with tubes and a reflux column executed as a shell-and-tube heat exchanger installed at the top, distillation column for separating diesel fuel and gasoline fractions, consisting of a reflux column, a packed part (enriching section with mass-exchanging packed beds), a feed section (vapor-gas mixture feed) and a distillation column bottom (stripper) with a re-boiler installed heated by fuel (exhaust) gases, for stripping the light fraction of the vapor-gas mixture, a heat exchanger for cooling the diesel fraction; a vertical shell-and-tube heat exchanger with downward gasoline vapors and hydrocarbon gas, mass-exchanging packed beds filled with a heterogeneous catalyst in the form of spirally wound titanium strips, and each spiral is pre-twisted in one direction or in different directions, forming right-hand and left-hand spirals in the latter case, titanium strips are placed in the receiver, in heat exchanger tubes, where the high-boiling hydrocarbons from the vapor-gas mixture condense, in dewaxing unit's reflux column tubes and distillation column's reflux column tubes, spirally wound titanium strips are found in mass-exchanging packed beds in the dewaxing unit and the distillation column; dampers are installed before and after the receiver on the exhaust gas pipeline; receivers for distillation products available: gasoline, diesel fuel, gas (gas holder), heating oil (with wax fraction); and also a gas/water separator, a fuel tank for the burner; heat exchanger for cooling heating oil; (separated) water sump; circulating water tank. Hydrocarbon receiver capacity is deduced from experiments.

The features of the closest prior art that are the same as the essential features of the second invention are that the device for polyethylene and polypropylene waste destructive distillation has at least two parallel heating units, each of which contains a destructive distillation reactor with top polymer feedstock feed (through the feeding unit) and bottom carbon residue discharge through the bottom side hatch of the reactor, each of the reactors contains a furnace designed to be detached from and attached to the reactor, fuel burner; decomposition unit for polymer feedstock destructive distillation products, which consists of the following items connected in sequence: water cooled heat exchanger with a downflow of a vapor-gas mixture of hydrocarbons, hydrocarbon receiver executed as a horizontal cylindrical container equipped with re-boiler heated by exhaust gases, and dewaxing unit installed on the receiver, consisting of a bottom part with tubes and mass-exchanging packed beds filled with a catalyst, and a reflux column executed as a shell-and-tube heat exchanger installed at the top of the dewaxing unit; distillation column for separating diesel fuel and gasoline fractions, consisting of a reflux column installed at the top of the column, an enriching section with mass-exchanging packed beds filled with a catalyst, a feed section and a stripper, a heat exchanger for cooling the diesel fraction; a vertical shell-and-tube heat exchanger with downward gasoline vapors and hydrocarbon gas (gaseous fraction); a gas/water separator, vapor-gas mixture of hydrocarbons piping systems, exhaust gas piping systems with dampers installed before and after the hydrocarbon receiver; cooling systems installed on the piping of vapor-gas mixture of hydrocarbons from destructive distillation product receivers: diesel fuel fractions, gasoline fractions, gas fractions (gas holder), wax fraction receiver; circulating water tank installed in the cooling system; coke receiver, separated water sump.

Technical result of the first and second inventions involves improved performance and effectiveness of the method and device for destructive distillation of polyethylene and polypropylene waste, improved quality of distillation products, improved safety of the device for and process of destructive distillation, reduced emissions and power consumption.

The following disadvantages of the closest prior art to the first invention delay the said technical result. A disadvantage of the known method is that it involves transporting and attaching a 1,000° C. heated furnace with heavy having to the second cold reactor, supposedly to save fuel and heating time. It is unsafe for service personnel to even approach the furnace, let alone move it from one reactor to another and then hook it up. A disadvantage of the known method is that the reactor volume is fed with feedstock at a time with subsequent degradation all the way through the process. The entire volume of feedstock becomes liquified and takes up only a quarter of the reactor's total volume. Given that degradation, according to the closest prior art, goes to completion without stopping, there is an ineffective use of the reactor operating at only one-fourth of its capacity. Another disadvantage of the known method is that carbon residue sticks to the bottom of the reactor in the absence of a non-stick layer of thinning lubricant (for example, heavy high melting point waxes). Another disadvantage is that exhaust gases are dumped in the air at 470-500° C. when fuel gases are cut off by closing the dampers before the inlet and after the outlet upon reaching operating temperatures in the hydrocarbon receiver and in the distillation column bottom. Feeding fuel gases with a temperature of 600-900° C. from the hydrocarbon receiver's re-boiler to the distillation column bottom of the closest prior art does not in any way affect a significant (50-60% on average) reduction in the amount of substandard fractional products formed during the start-up period and does not reduce heat and energy consumption. The process only complicates the design of the fractionation unit, making it more expensive, yet not solving the specified problem. Continuous operation of the closest prior art provides that the receiver is continuously drained for maintaining the specified levels. However, such streamlets will result in 'frozen' product in the cooler and blockage translating into an emergency.

The following disadvantages of the closest prior art to the second invention delay the said technical result. A disadvantage of the known device is that a movable furnace is done with heavy lining (heated to 1,000° C.). This solution is dangerous due to high-temperature radiation, residual vapors of degradation products given that no devices have been suggested that ensure protection from exposure to high temperatures and harmful gases. Moreover, the furnace with such a lining should cool down for at least 8 hours. A disadvantage of the known device is the presence of an explosive catalyst column filled with titanium chips to ensure purification of the vapor-gas mixture at the earliest stage of its release. Titanium chips slagging will result in reduced vapor-gas mixture permeability in the catalyst column due to titanium properties. Another disadvantage is that the surface of re-boiler from the receiver bottom is not protected from adhesion of heavy carbon component particles. Given the explosion risk, a disadvantage of the closest prior art is that it uses a heterogeneous catalyst, titanium, in the catalytic disposal process, since titanium does not in any way affect the separation and breaking of hydrocarbon molecular bonds. On the contrary, the chemical properties of titanium demonstrate that is not practical and dangerous to use this metal as a catalyst in the form of 5-20 mm wide, 0.5-1.5 mm thick titanium strips in hydrocarbon disposal. Titanium is very resistant to corrosion thanks to the oxide film, but when ground into powder, as well as in fine chips or wire, titanium is pyrophoric. Titanium powder is likely to explode (flash point: 400° C.), and titanium chips are flammable. Titanium easily reacts even with weak acids in the presence of complexing agents, for example, it interacts with HF acid due to the development of $[TiF_6]^{2-}$ complex anion. Titanium is most susceptible to corrosion in organic media, given that in the presence of water, a dense passive film of titanium oxides and hydride appears on the surface of a titanium product. The highest increase in the corrosion resistance of titanium is observed with an increase of water content in aggressive media from 0.5 to 8.0%, as confirmed by electrochemical studies of titanium electrode potentials in acid and alkali solutions in mixed aqueous-organic media. Heated titanium also interacts with halogens. For instance, if a polymer containing chlorine accidentally gets into the reactor, titanium will react with it at 550° C. and form titanium tetrachloride $TiCl_4$, which, when combined with water vapors contained in the gas flow, reacts to a strongly fuming colorless liquid (due to hydrolysis of $TiCl_4$) forming tiny HCl droplets and a titanium hydroxide suspensions. When disposing polymers containing $N_2$, when temperature goes above 400° C., titanium forms titanium nitride. The titanium-water interaction according to the $Ti+2H_2O=TiO_2+2H_2$ scheme involves two simultaneous processes—absorption of hydrogen by titanium and production of oxide compounds. Titanium strongly oxidizes in water; the increase in the oxygen content in titanium obtained from the interaction with water is more than ten times higher than air oxidation at the same temperatures, the hydrogen content in titanium after contact with water increases by 3-4 times. Titanium-hydrogen reaction produces titanium hydride ($TiH_2$). Moreover, titanium absorbs about 30% of hydrogen occupying octahedral voids. Hydrogen adsorbed at elevated temperatures does not remain only on the surface. Hydrogen diffuses into titanium at very high rates. Hydrogen diffuses into titanium through metal structure slits and other imperfections. This fast process is followed by slow diffusion of hydrogen and its dissolution in the metal to form a solid solution. Once solid solution is formed, a significant amount of hydrogen can be adsorbed on the intercrystalline slit surface, resulting in hydrogen absorption in amounts greater than stoichiometric. Oxide compounds remain completely in the metal and lead to its degradation. Based on the above, a catalyst made from titanium chips is a simple but dangerous filler for polymer waste disposal, that creates a blocking resistance to degradant gas flow. Titanium removes hydrogen from broken polymer chains, preventing creation of polymer feedstock destructive distillation product components. A flaw in design of a water-cooled heat exchanger with a downflow of a vapor-gas mixture of hydrocarbons is a design solution for collecting vapors into the general cooling system of the device, since such vapor collection causes heating of the cooling water and reduces cooling effectiveness. A continuous screw feeder in continuous operation eliminates reactor containment, which is central to disposal by thermal degradation and its safety. It is also structurally impossible to use a screw to clean the cylindrical reactor from carbon residue formed after degradation and discharge it. A screw with a diameter of 300 mm entering the reactor (for example, with a diameter of 1,500 mm) between flame tubes with a diameter of 300 mm cannot fully discharge the carbon residue, since the screw is not a vacuum cleaner. The carbon residue that accumulates during the reactor operation and is not removed from the sides of the reactor and between the flame tubes will prevent the required temperature and heating rate of 1.5-4° C./minute of the thermal degradation reactor contents. On top of that, the carbon residue accumulated at the bottom of the reactor will gradually turn into a coke block, which will contribute to overheating of the reactor bottom. Excessive temperatures will bring the metal to the forged condition, which may cause the bottom to sag, make it impossible to move the furnace heated to 1,000° C., cause welded joints of flame tubes and reactor bottom to rupture along the entire bottom, which will lead to an explosion.

The technical problem to be solved by the invention-method and the invention-device is to expand the range of structurally and technologically improved technical means for thermal degradation of polymer waste with destructive distillation products.

The problem raised by the first invention is solved in that the method for destructive distillation of polyethylene and polypropylene waste involving feeding polyethylene and polypropylene waste to the first destructive distillation reactor that is pre-cleaned by flotation from polyvinylchloride, polyethylene terephthalate, cellulose, organic compounds, rubber impurities; attaching and heating the furnace of the first destructive distillation reactor by a fuel burner; heating and maintaining the temperature in the hydrocarbon receiver with exhaust gases, while the temperature in the hydrocarbon receiver is controlled by feeding and cutting off exhaust gases to the re-boiler; controlling the outlet temperature of vapor-gas mixture of hydrocarbons from the dewaxing unit by supplying cooling water to the dewaxing unit's reflux column, collecting wax fractions; fractionating the remaining products of destructive distillation in the distillation column to obtain the vapor phase of the gasoline fraction and the liquid phase of the diesel fraction, controlling the outlet temperature of remaining vapor-gas mixture from the distillation column by supplying cooling water to the distillation column's reflux column; cooling the remaining vapor-gas mixture in the column of a constantly operating heat exchanger, separating it into gasoline and gas fractions; feeding the other destructive distillation reactor; cutting off fuel to the burner of the first reactor; lowering and cooling the furnace of the first reactor, attaching the furnace of the other reactor and heating it with a burner; discharging carbon residue from cooled destructive distillation reactors, according to the first invention, before feed, the bottom of each reactor is coated with a layer of non-stick lubricant; reactor furnaces are attached with air cushions, reactors are vacuum fed in several steps according to the following cycle: "reactor feed, evacuation of the loaded reactor volume, heating the reactor to 110-260° C. to thin the feedstock" until the thinned feedstock reaches 0.7 of the height of the reactor's full capacity; once the loaded first reactor switches to destructive distillation operating mode, the other reactor is loaded in several stages according to the same cycle "reactor feed, evacuation of the loaded reactor volume, heating the reactor to 110-260° C. to thin the feedstock" until the thinned feedstock reaches 0.7 of the height of the other reactor's full capacity; the cooling of the reactors is carried out by supplying carbon dioxide; reactor is cleaned in a cooled state with an industrial sandblaster or vacuum cleaner through the lower side hatch; the temperature of exhaust gases dumped in the air is reduced by running them through the boilers. According to the first invention, high melting point wax is used as a non-stick lubricant layer. According to the first invention, destructive distillation products are used as burner fuel. According to the first invention, the loaded volume of the reactor is evacuated with a vacuum pump. According to the first invention, carbon dioxide is fed from carbon dioxide containers connected to the reactors.

The technical problem raised by the second invention is solved in that the device for destructive distillation of polyethylene and polypropylene waste, including at least two parallel heating units, each of which contains a destructive distillation reactor with top polymer feed (through the feeding unit) and bottom carbon residue discharge through the bottom side hatch of the reactor, each of the reactors contains a furnace designed to be detached from and attached to the reactor, and a fuel burner; decomposition unit for polymer feedstock destructive distillation products, which consists of the following items connected in sequence: water cooled heat exchanger with a downflow of a vapor-gas mixture of hydrocarbons, hydrocarbon receiver executed as a horizontal cylindrical container equipped with re-boiler heated by exhaust gases, dewaxing unit installed on the receiver, consisting of a bottom part with tubes and mass-exchanging packed beds filled with a catalyst, and a reflux column executed as a shell-and-tube heat exchanger installed at the top of the dewaxing unit; distillation column for separating diesel fuel and gasoline fractions, consisting of a reflux column installed at the top of the column, an enriching section with mass-exchanging packed beds filled with a catalyst, a feed section and a stripper, a heat exchanger for cooling the diesel fraction; a vertical shell-and-tube heat exchanger with downward gasoline vapors and hydrocarbon gas (gaseous fraction); a gas/water separator, vapor-gas mixture of hydrocarbons piping systems, exhaust gas piping systems with dampers installed before and after the hydrocarbon receiver; cooling systems installed on the piping of vapor-gas mixture of hydrocarbons from destructive distillation product receivers: diesel fuel fractions, gasoline fractions, gas fractions (gas holder), wax fraction receiver; circulating water tank installed in the cooling system; coke receiver, separated water sump, according to the second invention, each furnace is lined with refractory high-temperature ceramic fibers and installed on air cushions; the feeding unit of each reactor is vacuum; the reactors are connected to the vapor-gas mixture piping system by pipeline chainage with bypasses; there is a vacuum pump installed in the vapor-gas mixture piping system suitable for connecting to/disconnecting from each of the reactors; there is a carbon dioxide container installed in the vapor-gas mixture piping system suitable for connecting to/disconnecting from each of the reactors; a water-cooled heat exchanger with a downflow of a vapor-gas mixture of hydrocarbons is equipped with a vapor discharge piping with an exit branch for steam smothering; each reactor is connected to the vapor-gas mixture piping system by separate sections equipped with gate valves with bypasses cut before and after with pressure control valves in the phased vapor-gas mixture release system; there are boilers installed in exhaust gas piping system; there is a wax fraction trap installed at the top of the receiver under the water-cooled heat exchanger, that is suitable for extracting and feeding the wax fraction through the wax fraction cooler to the wax fraction trap; there is a droplet separator in the form of a funnel tube installed at the top of the receiver under the dewaxing unit to prevent foaming in the receiver; there is a hatch at the end of the receiver on the exhaust gases inlet to connect the receiver with the cooler for draining heavy waxes into the heavy wax receiver; there is a filter damping the vapor-gas mixture installed after the dewaxing unit's reflex column, tangentially connected at the outlet with the feed section of the distillation column to create eddying flow of the vapor-gas mixture in the distillation column; at least three column plates are installed in the stripper of the distillation column; automatic level controls with a discharge valve are installed under the receiver before the wax fraction cooler, after the stripper before the diesel fraction cooling heat exchanger, after the gas/water separator; titanium-free nickel-containing alloys with at least 20% nickel are used as a catalyst in the mass-exchanging packed beds; the device is additionally equipped with a gas separator at the outlet of the gas/water separator. According to the second invention, pipeline chainage with gate valves to install a vacuum pump suitable for connecting to/disconnecting from each reactor is cut at the outlet from the feeding unit of each reactor. According to the second invention, the catalyst is made in the form of thin spirally wound strips (chips). According to the second invention, the furnace is lined with Hitermic HT high temperature soft ceramic board. According to the second invention, the furnace is made with refractory ceramic wool lining. According to the second invention, discharge valves of the automatic level controls are designed to open after the fractions reach the ⅔-½ level of the respective volumes.

There is the following causal relationship between the combination of essential features of inventions and the achieved technical result. The combination of the above essential features of the invention-method and invention-device is a necessary and sufficient condition for achieving the technical result. In particular, when using vacuum feeders to feed the reactors in several steps according to the following cycle "reactor feed, evacuation of the loaded reactor volume, heating the reactor to 110-260° C. to thin the feedstock" until the thinned feedstock reaches 0.7 of the height of the reactor's full capacity, reactor output is tripled. If we connect a second reactor (pre-heated to 300° C.) once the first reactor stops to the decomposition unit for polymer feedstock destructive distillation products, we will eliminate substandard products or reduce them to 2-3%, and cut heat and energy consumption for repeated "distillation" by 80%. When the operation is cyclic, it will significantly reduce the total process life per day, which will at least double device performance productivity per month compared to the closest prior art-method. By connecting domestic hot water boilers, we reduce the temperature of exhaust gases discharged in the air and provide hot water. Availability of an exit branch for steam smothering of the vapor discharge piping after the water-cooled heat exchanger with a downflow of a vapor-gas mixture of hydrocarbons will improve safety of the device and process for destructive distillation. The use of a catalyst-titanium-free nickel-containing alloy (with at least 20% nickel) chip will accelerate distillation, increase degradation rate by three times compared to the closest prior art-device and ensure creation of shorter hydrocarbon chains, as there will be a dehydrogenation reaction by nickel (nickel is the catalyst for this reaction), at 300-360° C. free hydrogen will start separating. Making the furnace with a refractory high-temperature ceramic fiber lining, in particular, of Hitermic HT high temperature soft ceramic board, will significantly reduce its weight. Vacuum pump used for feed will reduce the temperature at which feedstock melts and the loaded feedstock is compacted. Installing a damping filter after the dewaxing unit's reflux column will stabilize the vapor-gas mixture flow. Installing furnaces on air cushions will balance their thermal expansion. Creation of eddying flow of the vapor-gas mixture in a spiral in the distillation column will allow for its smooth engagement with the mass-exchanging packed beds and increase their contact area. Availability of distillation column plates in the stripper will allow for a total evaporation and separation of fractions. The use of carbon dioxide will lower the temperature in the cooled reactor, equalize its pressure and reduce the cooling time. Vacuum feed will ensure uninterrupted batch feeding, compliance with sanitary standards and production safety standards.

Figure 2:
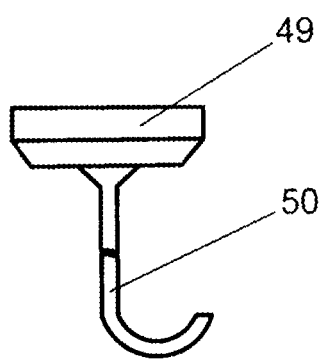

The inventions are illustrated in the drawings, where FIG. 1 shows a diagram of the device for destructive distillation of polyethylene and polypropylene waste, and FIG. 2 shows a droplet separator.

The device for destructive distillation of polyethylene and polypropylene waste contains two parallel heating units and decomposition unit for polymer feedstock destructive distillation products (the units are not shown in the figures). Each of the heating units (not shown in the figures) has destructive distillation reactor 1 and 2, which include a vacuum feeder 3 suitable for detaching, moving and connecting it through the dampers at the feed inlet (not shown in the figures) into each reactor 1, 2, lower side hatch 4, furnace 5 lined with Hitermic HT high temperature soft ceramic board (not shown in the figures), installed on air cushions 6, and suitable for detaching from and connecting to reactors 1, 2, and equipped with a burner 7. Each reactor 1, 2 is connected to bypasses 8 and 9 for relieving excess pressure when feeding and cooling reactors 1, 2 with a vapor-gas mixture piping system 10 connected right near reactors 1, 2 to a vacuum pump 11 connected to reactors 1, 2 by pipeline 14 through shut off valves 12, 13 for installation suitable for connecting to/disconnecting from each of reactors 1, 2. Gate valves 15 are set up parallel to bypasses 8, 9. The destructive distillation product decomposition unit (not shown in the figures) includes exhaust gas piping system 16 and a water cooling piping system 17. The destructive distillation product decomposition unit (not shown in the figures) consists of the following items connected in sequence: water cooled heat exchanger 18 with a downflow of a vapor-gas mixture of hydrocarbons, hydrocarbon receiver 19 executed as a horizontal cylindrical container equipped with re-boiler 20 heated by exhaust gases of the system 16, dewaxing unit 21 installed on the receiver 19, consisting of a bottom part with tubes and mass-exchanging packed beds (not shown in the figures), and a reflux column 22 installed at the top of the dewaxing unit 21. The destructive distillation product decomposition unit (not shown in the figures) includes a distillation column 23 for separating diesel fuel and gasoline fractions, consisting of a reflux column 24 at the top of the column, an enriching section 25 with mass-exchanging packed beds (not shown in the figures), a feed section 26 and a stripper 27. The destructive distillation product decomposition unit (not shown in the figures) also includes a heat exchanger 28 for cooling the diesel fraction; a constantly operating vertical shell-and-tube heat exchanger 29 with downward gasoline vapors and hydrocarbon gas (gaseous fraction). The destructive distillation product decomposition unit (not shown in the figures) includes a wax fraction receiver 30, a diesel fuel fraction receiver 31, a gasoline fraction receiver 32, a gas/water separator 33, a gas separator 34, and a gas fraction receiver (gas holder) 35 installed in the vapor-gas mixture of hydrocarbons piping system 10. decomposition unit (not shown in the figures) includes a circulating water tank 36 installed in the cooling system 17. Reactors 1, 2 are connected by pipe connectors 37, 38 with bypasses 8 and 9 and gate valves 15 installed thereon by the chainage of the vapor-gas mixture piping 39. Dampers 40, 41 are installed in the exhaust gas piping systems 16 before and after the hydrocarbon receiver 19. The water-cooled heat exchanger 18 is equipped with a vapor discharge piping 42 with a shut-off valve 43 and exit branch 44 with a shut-off valve 45 for steam smothering. There is a hatch 46 at the end of the receiver 19 on the exhaust gases inlet 16; the wax fraction cooler 47 is installed under the receiver 19. There is a heavy wax trap 48 at the top of the receiver 19 under the water-cooled heat exchanger 18. There is a droplet separator (not shown in the figures) in the form of a funnel 49 tube 50 (to avoid splashing) installed at the top of the receiver 19 under the dewaxing unit 21 to prevent foaming. There is a filter damping 51 the vapor-gas mixture installed on the piping 10 after the dewaxing unit 21, tangentially connected at the outlet with the feed section 26 of the distillation column 23 to create eddying flow of the vapor-gas mixture in the distillation column 23. There are column plates (not shown in the figures) installed in the stripper 27 of the distillation column 23. The stripper 27 is equipped with an automatic level control 52 with a discharge valve 53 designed to open after the diesel fuel fraction reaches a certain level, for example ⅔ of the stripper volume. Similar automatic level controls 52 with a discharge valve 53 are installed under the receiver 19 before the diesel fraction cooler 47 and after the gas/water separator 33. The vapor-gas mixture piping 10 has a carbon dioxide container 55 connected to each reactor 1, 2 to increase the pressure after cooling the reactor through the shut-off valves 54. The exhaust gas pipeline 56, with the boiler 57 installed used during feeding, is connected along the exhaust gases after the reactors 1, 2. Boiler 58 is installed in the exhaust gas system 16 after the receiver 19. After the heavy wax trap 48 that is suitable for extracting and feeding heavy wax, it goes through the heavy wax fraction cooler 59 to the wax fraction receiver 60. The separated water sump 61 goes after the gas/water separator 33. The exit branch 62 from the exhaust gas system 16 is provided to prevent receiver 19 overheating and release exhaust gases. The exhaust gas system 16 has pipeline chainage 63 with gate valves 64 and 65 and exhaust gas pipeline chainage 66, 67 with gate valves 68 and 69 for disconnecting, for example, an operating reactor 1 from an idle reactor 2 and vice versa.

The method for destructive distillation of polyethylene and polypropylene waste on a device for its implementation should be performed as follows. Prepare feedstock by cleaning polyethylene and polypropylene waste by flotation from polyvinyl chloride, polyethylene terephthalate, cellulose, chlorine, sulfur, derivatives of terephthalic acid compounds and organic compounds impurities. Prior to feeding, apply a layer of non-stick lubricant, for example, heavy (high melting point) wax, to the bottom of each reactor 1, 2. Attach the furnace 5 to the reactor 1 with air cushions 6 fed by a compressor (not shown in the figures), and start the burner 7, operating, for example, on own produced gas or diesel and/or wax fraction products. The reactor 1 is fed by vacuum feeder 3 in several steps according to the following cycle: "full reactor feed, evacuation of the loaded volume, heating to 110-260° C. to thin the feedstock" until the thinned feedstock reaches 0.7 of the height of the reactor 1's full capacity, which is heated at 2-3° C./min. Evacuation is carried out using a vacuum pump 11, opening valve 12 and closing valve 13. Having loaded the reactor 1, when the thinned feedstock reaches 0.7 of the full capacity height, the vacuum pump 11 is turned off, closing valve 12. Exhaust gases with a temperature of 400-450° C. flow from reactor 1 through the exhaust gas piping system 16 with gate valve 64 open and gate valves 65, 68, 69 to the receiver 19, then to the boiler 58, and then are dumped in the air at 140-142° C. The exit branch 62 from the exhaust gas piping system 16 is provided to prevent receiver 19 from overheating above 350° C. by releasing exhaust gases to the boiler 58. Reactor 2 is disconnected by gate valves 9 and 15 from the vapor-gas mixture piping system 10. The vapor-gas mixture of hydrocarbons released from the reactor 1 flows through the constantly operating water-cooled heat exchanger 18 (designed to prevent vapor-gas mixture overheating) into the receiver 19, the capacity of which is calculated empirically (wax will account for one third of total feed, the receiver's capacity should be at least two parts of the resulting wax). The vapor-gas mixture of hydrocarbons then goes to the dewaxing unit 21, where the first fraction, the wax fraction, is separated by cooling in the reflux column 22 of the dewaxing unit 21 with a dosed cooling water supply through the water cooling piping system 17 to the reflux column 22. Next, through the funnel 49 tube 50 of the droplet separator (not shown in the figures), liquid wax flows to the receiver 19. Liquid wax is maintained at the specified level and discharged from the receiver 19 through the wax fraction cooler 47 to the wax fraction receiver 30 by an automatic level control 52 with a discharge valve 53 that opens after the fraction reaches a certain level, for example ⅔ or ½ of the receiver 19 volume. Heavy waxes deposited in the heavy wax trap 48, are extracted in the receiver 19 and fed into the cooler 59, and then into the heavy wax receiver 60. Then, through the piping system 10 the vapor-gas mixture flows into the damping filter 51 of the vapor-gas mixture and goes through the catalyst (titanium-free nickel-containing alloy (with at least 20% nickel) chip). There will be a dehydrogenation reaction by nickel (nickel is the catalyst for this reaction), at 300-360° C. free hydrogen will start separating, thus accelerating the vapor distillation process and ensuring creation of shorter hydrocarbon chains. After the damping filter 51, tangentially connected at the outlet with the feed section 26 of the distillation column 23, the vapor-gas mixture starts eddying, hot part of the condensed particles of diesel fuel (180° C.) falls down to the distillation column plates (not shown in the figures) in the stripper 27, heating them. Volatile components of the mixture go up to the enriching section 25 with mass-exchanging packed beds (not shown in the figures), where the mass exchange takes place (particle flow around each other), light fractions go up to the reflux column 24 of the distillation column 23, thanks to cooling water, residual particles of the diesel fuel fraction pick up coming heavy particles of the diesel fuel fraction and go down to the stripper 27 with distillation column plates (not shown in the figure), where the particles of the diesel fuel fraction are accumulated. The stripper 27 is equipped with an automatic level control 52 with a discharge valve 53 that open after the diesel fuel fraction reaches a certain level, for example ⅔ or ½ of the stripper volume. The collected diesel fuel fraction goes to the diesel fuel fraction receiver 31 through the diesel fraction cooling heat exchanger 28. After that, the vapor-gas mixture less the wax and diesel fractions flows to the vertical shell-and-tube heat exchanger 29 with cooling water at 20-25°, where it is separated into a gasoline fraction then flowing through the gas/water separator 33 into the gasoline fraction receiver 32, and a gas fraction consisting of at least eleven gases with the following wt. %: methane 67.336; ethane 10.290; propane 9.955; I-butane 1.263; N-butane 1.494; I-pentane 0.341; N-pentane 0.179; hexane+higher 0.351; carbon dioxide 8,500; oxygen 0.028; nitrogen 0.263. Gases have different densities and some of them will inevitably condense, thereby giving rise to an explosion risk when the gas mixture is directly directed at the burner 7 of reactors 1, 2. Therefore, after fractionation, the gas fraction gas mixture goes to the gas holder 35 through the gas separator 34. Then the freed from the gas condensate gas is pumped (not shown in the figures), for example, to the fuel burners 7 of the reactors 1, 2. The gas separator 34 allows not only drying gas, but also getting an additional product—gas condensate, which is a high-octane additive for the gasoline fraction. Liquid is maintained at the specified level and discharged from the gas/water separator 33 to the gasoline fraction receiver 32 by an automatic level control 52 with a discharge valve 53 that opens after the liquid reaches a certain level, for example ⅔ or ½ of the gas/water separator 33 volume. The water cooling piping system 17 is closed and has electric gate valves (not shown in the figures) before the heat exchanger 18, 22, 24. After the heat exchanger 29, water is collected in the circulating water tank 36. After the water-cooled heat exchanger 18, the generated vapor is released via piping 42, equipped with a shut-off valve 43. There will be steam smothering when closing the valve 43 and opening the shut-off valve 45 on the exit branch 44. The separated water from the gas/water separator 33 goes to the separated water sump 61 and then purified. Feed reactor 2 by the vacuum feeder 3 (moved from the reactor 1) in about 1.0-1.5 hours after reactor 1 started operation. Attach the furnace 5 to the reactor 2 with air cushions 6 fed by a compressor (not shown in the figures), and start the burner 7, operating, for example, on own produced gas or diesel and/or wax fraction products. Feed is done in several steps according to the following cycle: "full reactor feed, evacuation of the loaded volume, heating to 110-260° C. to thin the feedstock" until the thinned feedstock reaches 0.7 of the height of reactor 2's full capacity with 54, 65, 15 gate valves shut and 69 open, and the vacuum pump 11 connected. Evacuation is carried out using the vacuum pump 11, opening valve 13 (valve 12 remains closed). Having loaded reactor 2, when the thinned feedstock reaches 0.7 of the full capacity height, the vacuum pump 11 is turned off. Bypass 9 automatically relieves the pressure when the pressure in reactor 2 exceeds 0.5 atm during feed. When the temperature in reactor 1 drops to 400-440° C., the burner 7 is turned off, gate valves 15, 64 are closed with gate valve 12 closed, the furnace 5 is lowered and the reactor 1 is put in cooling mode. When reactor 1 cools down below 260° C. it causes negative pressure in the reactor. In this case, the carbon dioxide tank 55 is connected, valve 54 is automatically triggered starting the carbon dioxide, which makes it possible to speed up reactor 1 cooling to 1-1.5 hours. Reactor 1 exhaust gases with gate valve 68 open and gate valves 64, 15 closed, flow to the boiler 57, and then dumped in the air at 140-142° C. That said, residual evolution of vapors of the vapor-gas mixture from the coke takes place in reactor 1, the pressure rises, and when it reaches 0.5 atm the vapor-gas mixture is released to the piping system 10 through the bypass 8. When reactor 1 is completely cooled down, it is cleaned from coke with an industrial sandblaster and/or vacuum cleaner (not shown in the figures) through the lower side hatch 4 of the reactor 1. Then the hatch 4 is closed, vacuum feeder 3 is connected, furnace 5 is brought up, the valve 12 from the vacuum pump 11 is opened, and the reactor 1 is accelerated for the next cycle according to the same program. Industrial waste from synthetic polymer materials, mainly from polyethylene and polypropylene, is converted by destructive distillation into six useful high-quality products ready for use: gas mixture, gas condensate, gasoline fraction, diesel fraction, wax fraction (low and high melting point waxes), carbon residue free of sulfur and heavy metals. These industrial wastes are 100% disposed of, and one kilogram of waste yields one liter of liquid fractions.

The invention claimed is:

1. The method for destructive distillation of polyethylene and polypropylene waste involving feeding polyethylene and polypropylene waste to the first destructive distillation reactor that is pre-cleaned by flotation from polyvinylchloride, polyethylene terephthalate, cellulose, organic compounds, rubber impurities; attaching and heating the furnace of the first destructive distillation reactor by a fuel burner; heating and maintaining the temperature in the hydrocarbon receiver with exhaust gases, while the temperature in the hydrocarbon receiver is controlled by feeding and cutting off exhaust gases to the re-boiler; controlling the outlet temperature of vapor-gas mixture of hydrocarbons from the dewaxing unit by supplying cooling water to the dewaxing unit's reflux column, collecting wax fractions; fractionating the remaining products of destructive distillation in the distillation column to obtain the vapor phase of the gasoline fraction and the liquid phase of the diesel fraction, controlling the outlet temperature of remaining vapor-gas mixture from the distillation column by supplying cooling water to the distillation column's reflux column; cooling the remaining vapor-gas mixture in the column of a constantly operating heat exchanger, separating it into gasoline and gas fractions; feeding feedstock into the other destructive distillation reactor; cutting off fuel to the burner of the first reactor; lowering and cooling the furnace of the first reactor, attaching the furnace of the other reactor and heating it with a burner; discharging carbon residue from cooled destructive distillation reactors, characterized by the fact that before feed, the bottom of each reactor is coated with a layer of non-stick lubricant; reactor furnaces are attached with air cushions, reactors are vacuum fed in several steps according to the following cycle: "reactor feed, evacuation of the loaded reactor volume, heating the reactor to 110-260° C. to thin the feedstock" until the thinned feedstock reaches 0.7 of the height of the reactor's full capacity; once the loaded first reactor switches to destructive distillation operating mode, the other reactor is loaded in several stages according to the same cycle "reactor feed, evacuation of the loaded reactor volume, heating the reactor to 110-260° C. to thin the feedstock" until the thinned feedstock reaches 0.7 of the height of the other reactor's full capacity; the cooling of the reactors is carried out by supplying carbon dioxide; reactor is cleaned in a cooled state with an industrial sandblaster or vacuum cleaner through the lower side hatch; the temperature of exhaust gases dumped in the air is reduced by running them through the boilers.

2. The method of claim 1 is characterized in that high melting point wax is used as a non-stick lubricant layer.

3. The method of claim 1 is characterized in that destructive distillation products are used as burner fuel.

4. The method of claim 1 is characterized in that the loaded volume of the reactor is evacuated with a vacuum pump.

5. The method of claim 1 is characterized in that carbon dioxide is fed from carbon dioxide containers connected to the reactors.

6. The device for destructive distillation of polyethylene and polypropylene waste, including at least two parallel heating units, each of which contains a destructive distillation reactor with top polymer feedstock feed (through the feeding unit) and bottom carbon residue discharge through the bottom side hatch of the reactor, each of the reactors contains a furnace designed to be detached from and attached to the reactor, and a fuel burner; decomposition unit for polymer feedstock destructive distillation products, which consists of the following items connected in sequence: water cooled heat exchanger with a downflow of a vapor-gas mixture of hydrocarbons, hydrocarbon receiver executed as a horizontal cylindrical container equipped with re-boiler heated by exhaust gases, dewaxing unit installed on the receiver, consisting of a bottom part with tubes and mass-exchanging packed beds filled with a catalyst, and a reflux column executed as a shell-and-tube heat exchanger installed at the top of the dewaxing unit; distillation column for separating diesel fuel and gasoline fractions, consisting of a reflux column installed at the top of the column, an enriching section with mass-exchanging packed beds filled with a catalyst, a feed section and a stripper, a heat exchanger for cooling the diesel fraction; a vertical shell-and-tube heat exchanger with downward gasoline vapors and hydrocarbon gas (gaseous fraction); a gas/water separator, vapor-gas mixture of hydrocarbons piping systems, exhaust gas piping systems with dampers installed before and after the hydrocarbon receiver; cooling systems installed on the piping of vapor-gas mixture of hydrocarbons from destructive distillation product receivers: diesel fuel fractions, gasoline fractions, gas fractions, wax fraction receiver; circulating water tank installed in the cooling system; coke receiver, separated water sump, is characterized by the fact that, each furnace is lined with refractory high-temperature ceramic fibers and installed on air cushions; the feeding unit of each reactor is vacuum; the reactors are connected to the vapor-gas mixture piping system by pipeline chainage with bypasses; there is a vacuum pump installed in the vapor-gas mixture piping system suitable for connecting to/disconnecting from each of the reactors; there is a carbon dioxide container installed in the vapor-gas mixture piping system suitable for connecting to/disconnecting from each of the reactors; a water-cooled heat exchanger with a downflow of a vapor-gas mixture of hydrocarbons is equipped with a vapor discharge piping with an exit branch for steam smothering; each reactor is connected to the vapor-gas mixture piping system by separate sections equipped with gate valves with bypasses cut before and after with pressure control valves in the phased vapor-gas mixture release system; there are boilers installed in exhaust gas piping system; there is a wax fraction trap installed at the top of the receiver under the water-cooled heat exchanger, that is suitable for extracting and feeding the wax fraction through the wax fraction cooler to the wax fraction trap; there is a droplet separator in the form of a funnel tube installed at the top of the receiver under the dewaxing unit to prevent foaming in the receiver; there is a hatch at the end of the receiver on the exhaust gases inlet to connect the receiver with the cooler for draining heavy waxes into the heavy wax receiver; there is a filter damping the vapor-gas mixture installed after the dewaxing unit's reflex column, tangentially connected at the outlet with the feed section of the distillation column to create eddying flow of the vapor-gas mixture in the distillation column; at least three column plates are installed in the stripper of the distillation column; automatic level controls with a discharge valve are installed under the receiver before the wax fraction cooler, after the stripper before the diesel fraction cooling heat exchanger, after the gas/water separator; titanium-free nickel-containing alloys with at least 20% nickel are used as a catalyst in the mass-exchanging packed beds; the device is additionally equipped with a gas separator at the outlet of the gas/water separator.

7. The device of claim 6 is characterized in that pipeline chainage with gate valves to install a vacuum pump suitable for connecting to/disconnecting from each reactor is cut at the outlet from the feeding unit of each reactor.

8. The device claimed of claim 6 is characterized in that the catalyst is in the form of thin spirally wound strips in the form of chip.

9. The device claimed of claim 6 is characterized in that the furnace is lined with Hitermic HT high temperature soft ceramic board.

10. The device claimed of claim 6 is characterized in that the furnace is made with refractory ceramic wool lining.

11. The device claimed of claim 6 is characterized in that discharge valves of the automatic level controls are designed to open after the fractions reach the ⅔-½ level of the respective volumes.

* * * * *